United States Patent
Wakisaka et al.

(10) Patent No.: US 7,028,815 B2
(45) Date of Patent: *Apr. 18, 2006

(54) DOUBLE-WRAP BRAKE BAND APPARATUS

(75) Inventors: Toshiaki Wakisaka, Fukuroi (JP); Masaki Sakai, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/223,395

(22) Filed: Aug. 20, 2002

(65) Prior Publication Data

US 2003/0038000 A1 Feb. 27, 2003

(30) Foreign Application Priority Data

Aug. 23, 2001 (JP) .............................. 2001-252479

(51) Int. Cl.
  *F16D 51/00* (2006.01)
(52) U.S. Cl. ................. 188/77 R; 188/77 W; 188/259; 188/250 H; 192/107 T; 192/81 R
(58) Field of Classification Search ............. 188/77 W, 188/77 R, 75, 76, 26, 58, 249, 259, 250 A, 188/250 H, 340, 336; 192/107 T, 18 R, 192/80, 81 R
See application file for complete search history.

(56) References Cited

U.S. PATENT DOCUMENTS

| | | | | |
|---|---|---|---|---|
| 4,602,706 A | * | 7/1986 | Blinks et al. ................ | 188/259 |
| 4,757,880 A | * | 7/1988 | Grzesiak ................... | 188/77 W |
| 5,012,905 A | * | 5/1991 | Tanaka .................... | 188/250 H |
| 5,083,642 A | * | 1/1992 | Stefanutti et al. ........ | 188/77 W |
| 5,476,160 A | * | 12/1995 | Fenoglio et al. ......... | 188/77 W |
| 6,328,140 B1 | * | 12/2001 | Fujita ....................... | 188/77 W |
| 6,513,630 B1 | * | 2/2003 | Nakagomi ............... | 188/77 W |
| 2003/0038000 A1 | * | 2/2003 | Wakisaka et al. ........ | 188/77 W |
| 2004/0226781 A1 | * | 11/2004 | Wakisaka et al. ............. | 188/64 |

FOREIGN PATENT DOCUMENTS

JP 2001-140954 5/2001

* cited by examiner

*Primary Examiner*—James McClellan
*Assistant Examiner*—Mariano Sy
(74) *Attorney, Agent, or Firm*—Miles & Stockbridge P.C.

(57) ABSTRACT

A double-wrap band brake apparatus which has a double-wrap brake band comprising an annular intermediate band with a frictional surface formed on the inner periphery thereof, a pair of annular outer bands secured to the free end of the intermediate band in a state that the respective free ends of the outer bands oppose to each other and have frictional surfaces respectively formed on the inner peripheries thereof, an anchor bracket secured to the operating ends of the outer bands to be latched on the side of a main body casing, and an apply bracket secured to the operating end of the intermediate band for receiving a force in a direction in which the intermediate band and the outer bands are constricted from an actuator. The brake apparatus is used to brake a rotating member fitted in the double-wrap brake band. A center deviation correcting member for correcting a center deviation between the intermediate band and the outer bands is formed on at least one of the anchor bracket and the apply bracket.

8 Claims, 19 Drawing Sheets

DOUBLE-WRAP BRAKE BAND APPARATUS

This application claims the benefit of Japanese Patent Application No. 2001-252479 which is hereby incorporated by reference.

BACKGROUND OF THE INVENTION

1. Field of the Invention

The present invention relates to a double-wrap brake band apparatus for use in the automatic transmission or the like of a vehicle.

2. Related Background Art

In the automatic transmission of a vehicle or a general industrial machine, a band brake apparatus is frequently used for braking a gear changing element or a rotating element. In such a band brake apparatus, normally a frictional material is attached and bonded to an inner peripheral surface of a single steel plate which is annularly formed to serve as a brake band, and this brake band is constricted by an actuator to clamp a gear changing element or a rotating element disposed on the inner side thereof, thereby putting a brake. Then, recently, there is proposed a double-wrap band brake apparatus employing a double-wrap brake band in order to reduce the operating force of an actuator or to enhance the braking controllability.

The double-wrap brake band 3 is, as shown in FIG. 16 and FIG. 17 (a view of a part indicated by the arrow G in FIG. 16) as being used in the automatic transmission of a vehicle, mainly comprised of an intermediate band 11 in an annular form, and a pair of annular outer bands 15 welded to a free end of the intermediate band 11 through a coupling plate 13 in a state that the respective free ends thereof oppose to each other. Onto the inner peripheral surfaces of the intermediate band 11 and the outer band 15, frictional materials 17 and 19 are respectively bonded. An anchor bracket 21 to be latched by an anchor pin 5 which is provided on the side of a main body casing 1 is welded to the operating ends of the outer bands 15 and, on the other hand, an apply bracket 25 for receiving a force in a direction in which the intermediate band 11 and the outer bands 15 are constricted by means of a push rod 23 of an actuator 7 is welded to the operating end of the intermediate band 11. In this double-wrap brake band 3, when the push rod 23 of the actuator 7 is operated in the direction indicated by the arrow in FIG. 16, the intermediate band 11 and the outer bands 15 are constricted so as to put the brake on the gear changing element (hereinafter called the drum) 27 which is fitted in the double-wrap brake band 3.

In this respect, in the conventional double-wrap brake band 3 described above, the elastic modulus of the single intermediate band 11 is naturally different from that of the paired outer bands 15. For this reason, upon reception of a load from the actuator 7, an amount of deformation of the intermediate band 11 is larger than that of the outer bands 15, so that the intermediate band 11 is moved (rotated) relatively with respect to the outer bands 15 around a joint portion therebetween. This relative movement is generated not only when a load is received at braking, but also when the initial load is applied at setting. FIGS. 18 and 19 show a state of the double-wrap brake band 3 at the setting in an exaggerated manner. As can be seen from these drawings, the intermediate band 11 is arranged such that a part thereof on the operating end is protruded inwardly with respect to the outer bands 15 by the margin m, while a part on the free end is protruded outwardly with respect to the outer bands 15 by the margin n. Also, since the rigidity of the intermediate band 11 at the joint portion with the outer bands 15 is higher than that at other parts, an amount of deformation of the operating end-side portion of the intermediate band 11 is larger than that of the free end portion. As a result, the margin m is larger than the margin n.

The double-wrap brake band 3 is produced in a variety of sizes, depending on the use or specifications thereof, and a double-wrap brake band 3 in a larger size naturally has a greater weight. However, the plate thickness of the anchor bracket 21 or the diameter of the anchor pin 5 can not be enlarged in proportion to the weight of the double-wrap brake band 3, in order to reduce the size and the weight of the brake band. For this reason, in a double-wrap brake band 3 in large size and great weight, the plate thickness of the anchor bracket 21 or the diameter of the anchor pin 5 is relatively small. Thus, the brake band 3 may be secured to the main body casing 1 unsatisfactorily, and may be inclined with respect to the drum 27.

If such a relative movement between the intermediate band 11 and the outer bands 15, or an inclination of the double-wrap brake band 3 as described above is generated, it is feared that the frictional materials 17 and 19 which are bonded to the inner peripheral surfaces of the intermediate band 11 or the outer bands 15 may come in contact with the outer peripheral surface of the drum 27. In this case, in the double-wrap brake band 3 installed in the automatic transmission of a vehicle, the frictional materials 17 and 19 are always in sliding contact with the outer peripheral surface of the drum 27 during a run of the vehicle, except when the double-wrap brake band apparatus 3 effects braking, which results in certain problems such that the fuel cost of the vehicle for running is increased and that the surfaces of the frictional materials 17 and 19 are deteriorated due to the friction heat.

SUMMARY OF THE INVENTION

The present invention has been made taking the above circumstances into consideration, and an object thereof is to provide a double-wrap band brake apparatus capable of preventing unnecessary contact between a double-wrap brake band and a rotating member easily and effectively.

In order to solve the problems described above, according to a first aspect of the present invention, there is proposed a double-wrap band brake apparatus which has a double-wrap brake band comprising an annular intermediate band with a frictional surface formed on the inner periphery thereof, a pair of annular outer bands secured to the free end of the intermediate band in a state that the respective free ends of said outer bands oppose to each other and having frictional surfaces respectively formed on the inner peripheries of said outer bands, an anchor bracket secured to the operating ends of the outer bands to be latched on the side of a main body casing, and an apply bracket secured to the operating end of the intermediate band for receiving a force in a direction in which the intermediate band and the outer bands are constricted from an actuator, and which is used to brake a rotating member fitted in the double-wrap brake band, wherein a center deviation correcting member for correcting a center deviation between the intermediate band and the outer bands is formed on at least one of the anchor bracket and the apply bracket.

In the double-wrap band brake apparatus according to the first aspect of the present invention, the center deviation correcting member may be a correcting portion which is formed on the apply bracket and comes in sliding contact with the outer peripheral surfaces of the outer bands.

In the double-wrap band brake apparatus according to the first aspect of the present invention, the center deviation correcting member may be a correcting portion which is formed on the anchor bracket to come in sliding contact with the outer peripheral surfaces of the outer bands.

According to a second aspect of the present invention, there is proposed a double-wrap band brake apparatus which has a double-wrap brake band comprising an annular intermediate band with a frictional surface formed on the inner periphery thereof, a pair of annular outer bands secured to the free end of the intermediate band in a state that the respective free ends of said outer bands oppose to each other and have frictional surfaces respectively formed on the inner peripheries thereof, an anchor bracket secured to the operating ends of the outer bands to be latched on the side of a main body casing, and an apply bracket secured to the operating end of the intermediate band for receiving a force in a direction in which the intermediate band and the outer bands are constricted from an actuator, and which is used to brake a rotating member fitted in the double-wrap brake band, wherein there is further provided a center deviation correcting ring formed by coupling a plurality of correcting pieces contacting in a slidable manner with the outer peripheral surfaces of the outer bands and the outer peripheral surface of the intermediate band with each other by means of an annular member in order to correct a center deviation between the intermediate band and the outer bands.

According to a third aspect of the present invention, there is proposed a double-wrap band brake apparatus which has a double-wrap brake band comprising an annular intermediate band with a frictional surface formed on the inner periphery thereof, a pair of annular outer bands secured to the free end of the intermediate band in a state that the respective free ends of said outer bands oppose to each other and have frictional surfaces respectively formed on the inner peripheral sides thereof, an anchor bracket secured to the operating ends of the outer bands to be latched on the side of a main body casing, and an apply bracket secured to the operating end of the intermediate band for receiving a force in a direction in which the intermediate band and the outer bands are constricted from an actuator, and which is used to brake a rotating member fitted in the double-wrap brake band, wherein there is further provided a center deviation correcting ring formed by coupling a plurality of correcting pieces contacting in a slidable manner with the outer peripheral surfaces of the outer bands and the outer peripheral surface of the intermediate band with each other by means of a C-shaped resilient member in order to correct a center deviation between the intermediate band and the outer bands.

In the double-wrap band brake apparatus according to the second or third aspect of the present invention, the center deviation correcting ring may be provided with a bearing portion which is brought into slidable contact with the outer peripheral surface of the rotating member.

In the double-wrap band brake apparatus according to the second or third aspect of the present invention, the correcting pieces may be provided with latching protrusions which are brought into slidable contact with side surfaces of the outer bands in order to restrict an axial movement of the center deviation correcting ring.

According to a fourth aspect of the present invention, there is proposed a double-wrap band brake apparatus which has a double-wrap brake band comprising an annular intermediate band with a frictional surface formed on the inner periphery thereof, a pair of annular outer bands secured to the free end of the intermediate band in a state that the respective free ends of said outer bands oppose to each other and have frictional surfaces respectively formed on the inner peripheries thereof, an anchor bracket secured to the operating ends of the outer bands to be latched on the side of a main body casing, and an apply bracket secured to the operating end of the intermediate band for receiving a force in a direction in which the intermediate band and the outer bands are constricted from an actuator, and which is used to brake a rotating member fitted in the double-wrap brake band, wherein there is provided a C-shaped resilient ring formed with a plurality of correcting projections contacting in a slidable manner with the outer peripheral surfaces of the outer bands and the outer peripheral surface of the intermediate band formed on the inner peripheral surface thereof as a center deviation correcting ring, in order to correct a center deviation between the intermediate band and the outer bands.

According to a fifth aspect of the present invention, there is proposed a double-wrap band brake apparatus which has a double-wrap brake band comprising an annular intermediate band with a frictional surface formed on the inner periphery thereof, a pair of annular outer bands secured to the free end of the intermediate band in a state that the respective free ends of said outer bands oppose to each other and have frictional surfaces respectively formed on the inner peripheral sides thereof, an anchor bracket secured to the operating ends of the outer bands to be latched on the side of a main body casing, and an apply bracket secured to the operating end of the intermediate band for receiving a force in a direction in which the intermediate band and the outer bands are constricted from an actuator, and which is used to brake a rotating member fitted in the double-wrap brake band, wherein there is provided at least one center deviation correcting clip having correcting projections contacting in a slidable manner with the outer peripheral surfaces of the outer bands and the outer peripheral surface of the intermediate band formed on the inner peripheral surface thereof, in order to correct a center deviation between the intermediate band and the outer bands.

In the double-wrap band brake apparatus according to the fifth aspect of the present invention, the center deviation correcting clip may be provided with engagement portions to be engaged with engagement protrusions formed on the outer side surfaces of the outer bands.

DETAILED DESCRIPTION OF THE PREFERRED EMBODIMENTS

Detailed description will be made below of several embodiments in which the present invention is applied to a double-wrap band brake apparatus in the automatic transmission for a vehicle with reference to the attached drawings.

Figure 1:
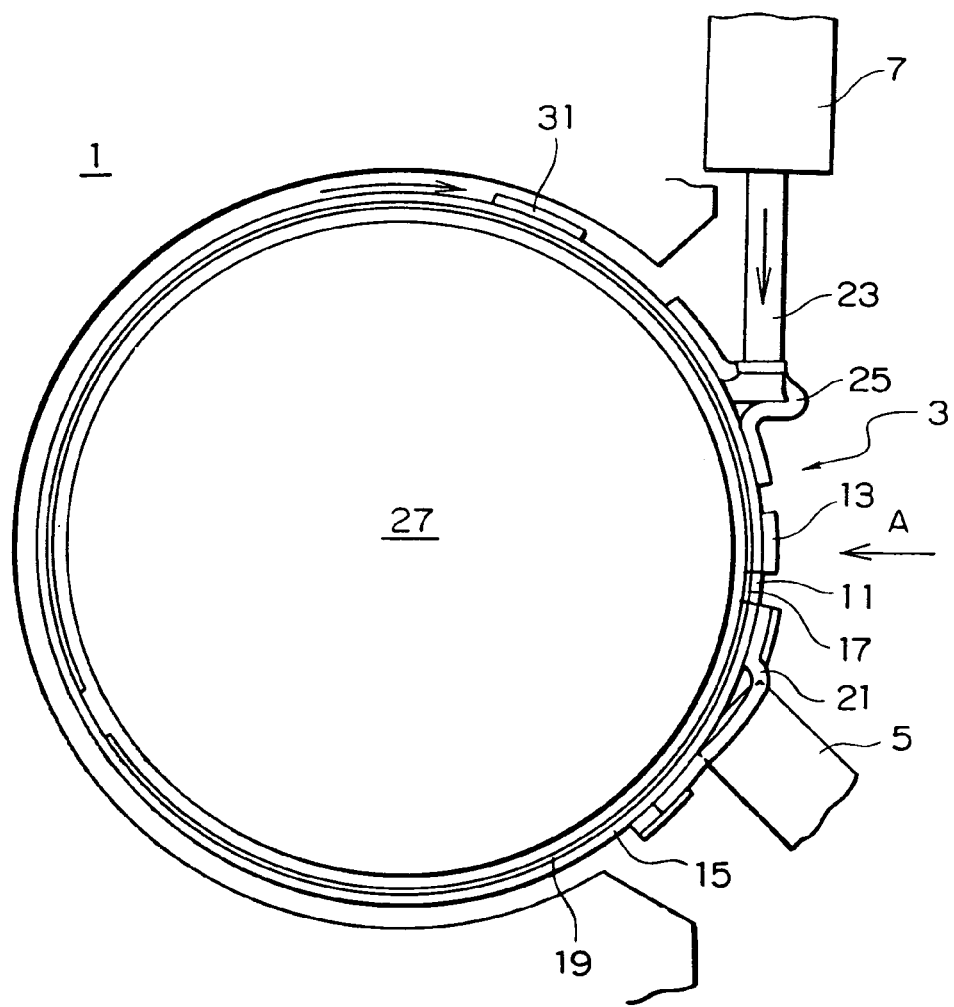
FIG. 1 is a side view for showing a double-wrap band brake apparatus according to a first embodiment of the present invention.
Figure 2:
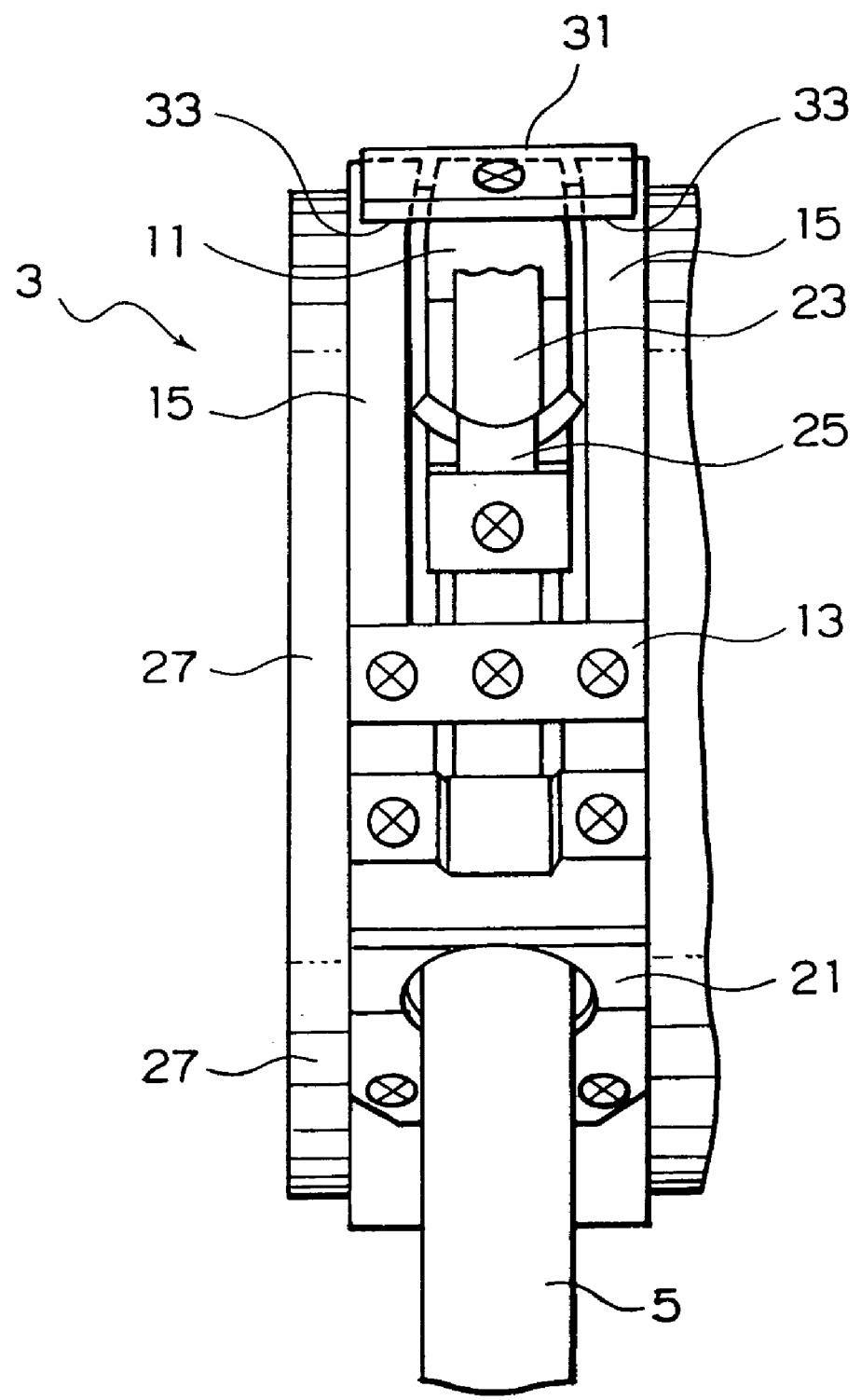
FIG. 2 is a view of a part indicated by the arrow A in FIG. 1.
Figure 3:
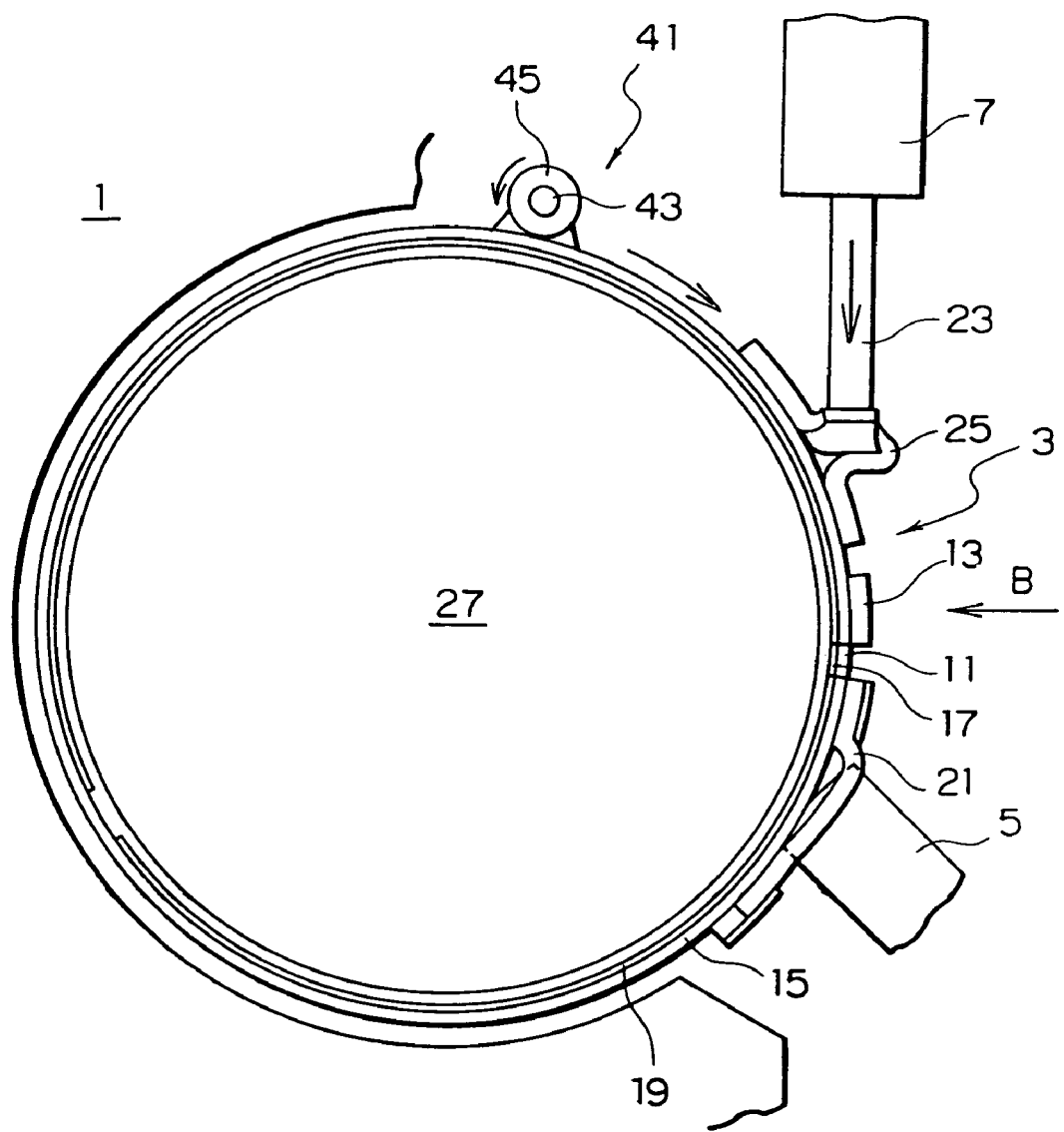
FIG. 3 is a perspective view for showing an essential part of the double-wrap band brake apparatus according to the first embodiment, in an enlarged manner.

FIG. 1 shows a side view of the double-wrap band brake apparatus according to the first embodiment of the present invention, and FIG. 2 shows an enlarged front view of the part indicated by the arrow A in FIG. 1 (seen frontally), and FIG. 3 is a perspective view of an essential part of the double-wrap band brake apparatus in an enlarged manner. As shown in these drawings, the double-wrap band brake apparatus of the first embodiment is comprised of a main body casing (a transmission casing) 1, a double-wrap brake band 3 set inside the main body casing 1, an anchor pin 5 for fixing the double-wrap brake band 3 to the main body casing 1, and an actuator 7 for driving the double-wrap brake band 3.

The double-wrap brake band 3 has as its main constituent parts an annular intermediate band 11, and a pair of annular outer bands 15 which are welded to the free end of this intermediate band 11 through a coupling plate 13 in a state that the respective free ends of the outer band 15 oppose to each other. Frictional materials 17 and 19 are bonded to the inner peripheral surface of the intermediate band 11 and the inner peripheral surfaces of the outer bands 15, respectively. An anchor bracket 21 which is latched by an anchor pin 5 on the side of the main body casing 1 is welded to the operating ends of the outer bands 15, while an apply bracket 25 for receiving a force in a direction in which the intermediate band 11 and the outer bands 15 are constricted from a push rod 23 of the actuator 7 is welded to the operating end of the intermediate band 11. In this double-wrap brake band 3, when the push rod 23 of the actuator 7 is operated in the direction indicated by the arrow in FIG. 1, the intermediate band 11 and the outer bands 15 are constricted so as to put a brake on the drum 27 which is fitted in the double-wrap brake band 3.

In case of the first embodiment, the apply bracket 25 is provided with a pair of correcting units 31 which are protruded toward the outer bands 15 from the rear end portion, as the center deviation correcting means. These correcting units 31 are brought into sliding contact with the outer peripheral surfaces of the outer bands 15, whereby the intermediate band 11 is not protruded inwardly with respect to the outer bands 15 even when it is constricted upon receiving a load from the actuator 7 and, as a matter of course, when it is set, though only a pressure contact force between the correcting units 31 and the outer bands 15 becomes larger. As a result, the double-wrap brake band 3 is constricted in a nearly perfect circular form to put a brake on the drum 27 in a braking mode, while having an appropriate space from the drum 27 over the entire circumference thereof in a non-braking mode.

Figure 4:
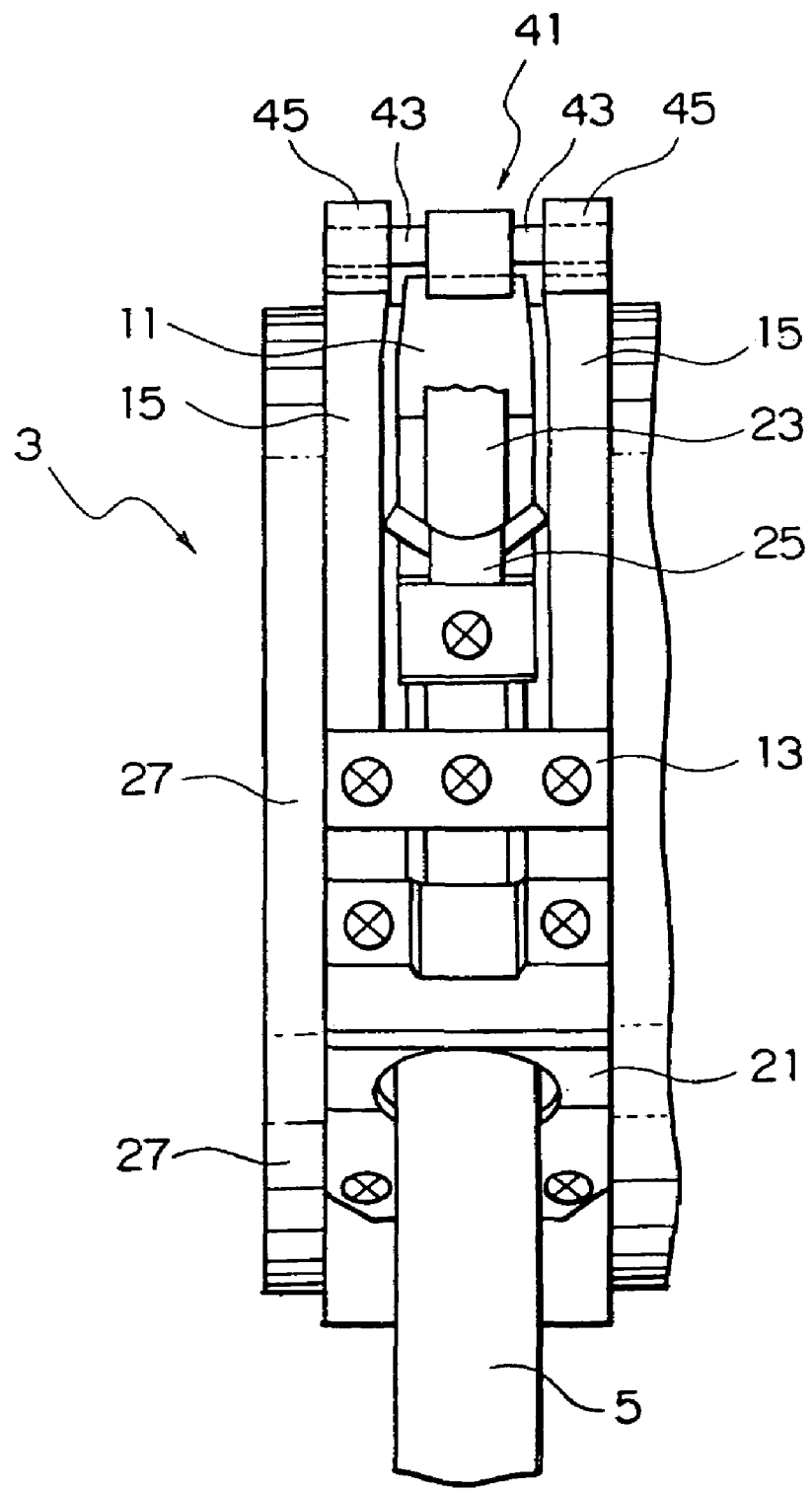
FIG. 4 is a side view for showing a double-wrap band brake apparatus according to a second embodiment of the present invention.
Figure 5:
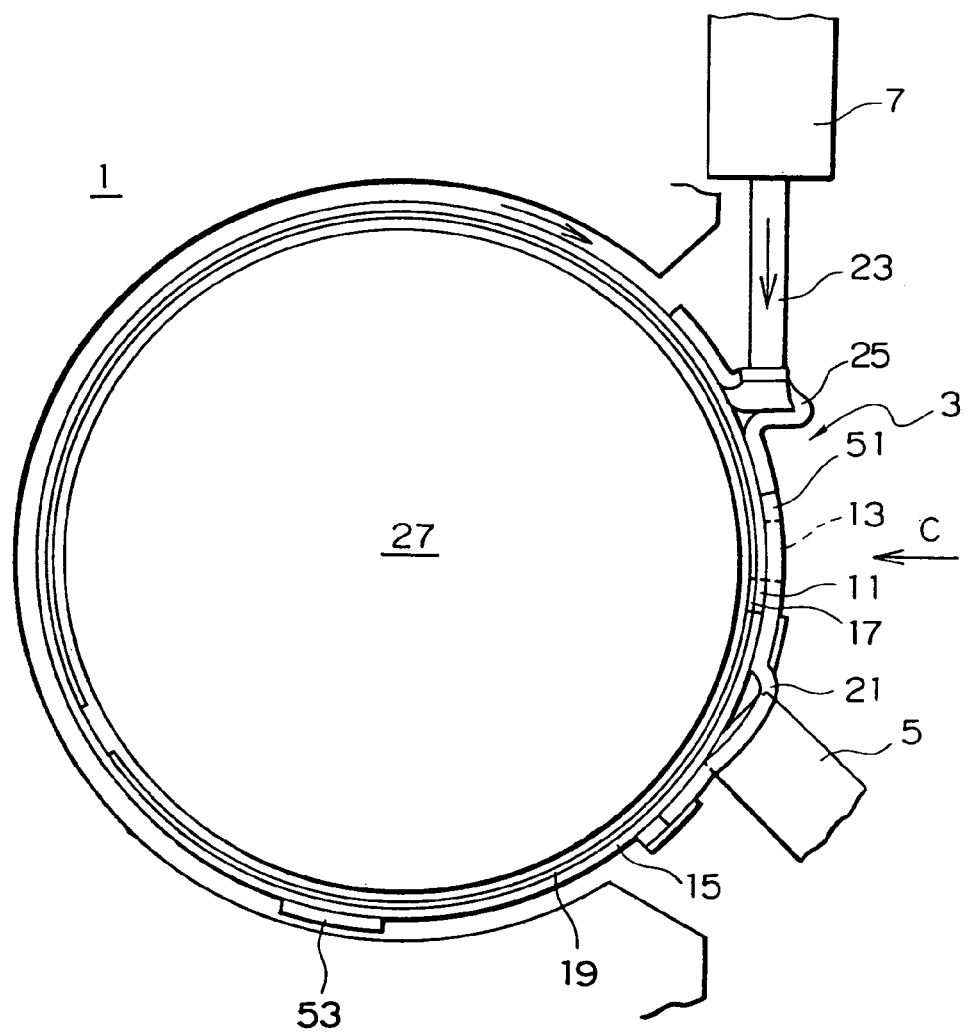
FIG. 5 is a view of a part indicated by the arrow B in FIG. 4.

FIG. 4 shows a side view of the double-wrap band brake apparatus according to the second embodiment of the present invention, and FIG. 5 shows a front view of the part indicated by the arrow B in FIG. 4. As shown in these drawings, the second embodiment has substantially the same basic structure as the first embodiment, so that the same reference numerals are given to the similar components and description will be made only on different points. An anchor bracket 21 in the second embodiment is provided with a correcting unit 33 oriented to the free end side thereof as the center deviation correcting means. The inner surface of the correcting unit 33 is in sliding contact with the outer peripheral surface of the intermediate band 11. With this arrangement, the intermediate band 11 is not protruded outwardly with respect to the outer bands 15 even if it is constricted upon receiving a load from the actuator 7 and, as a matter of course, when it is set, though only a pressure contact force with the correcting unit 33 becomes larger. As a result, in the same manner as in the first embodiment, the double-wrap brake band 3 is constricted in a nearly perfect circular form to put a brake on the drum 27 in the braking mode, while having an appropriate space from the drum 27 over the entire circumference thereof in the non-braking mode.

Figure 6:
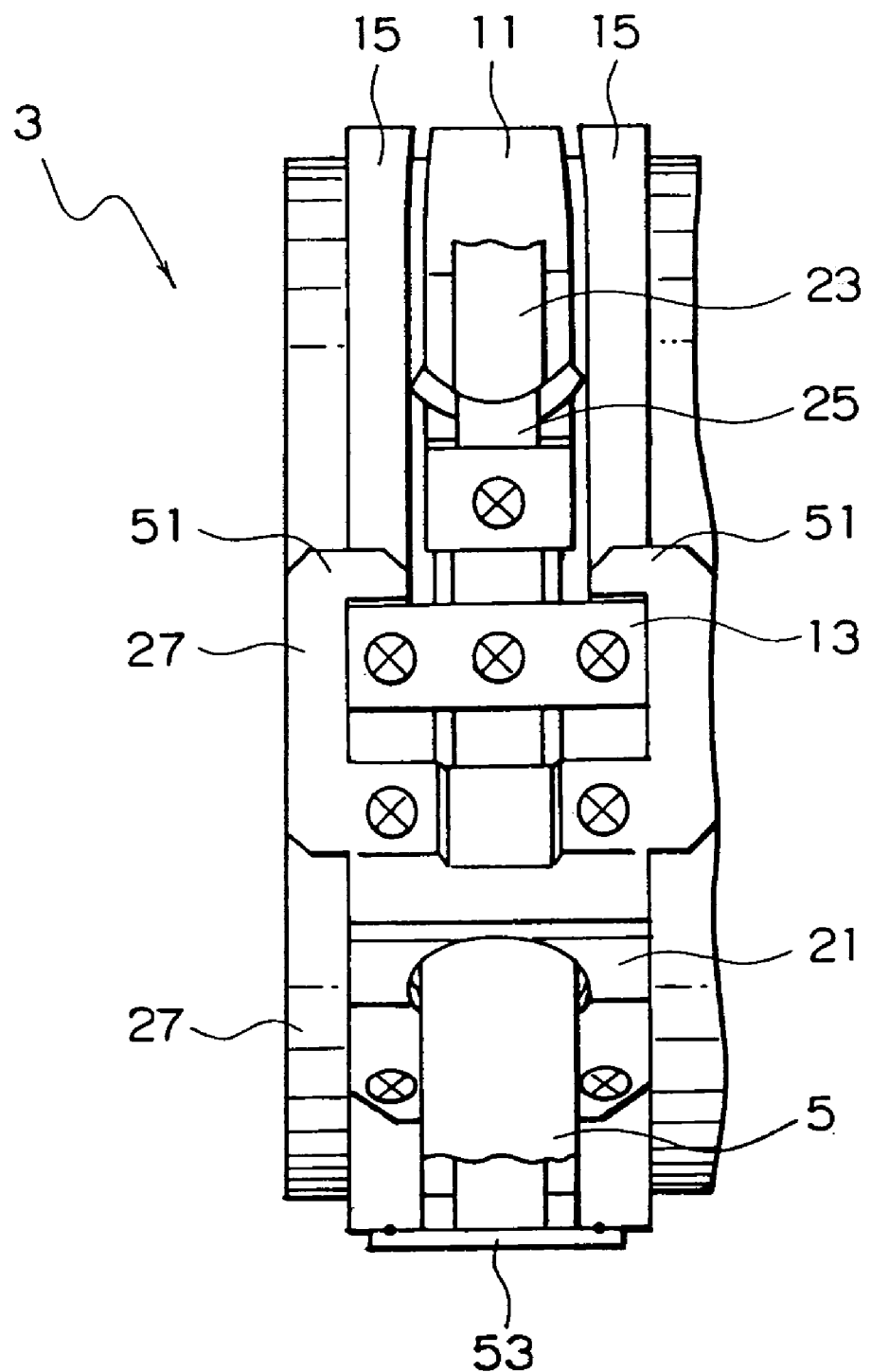
FIG. 6 is a side view for showing a correcting ring according to a third embodiment of the present invention.
Figure 7:
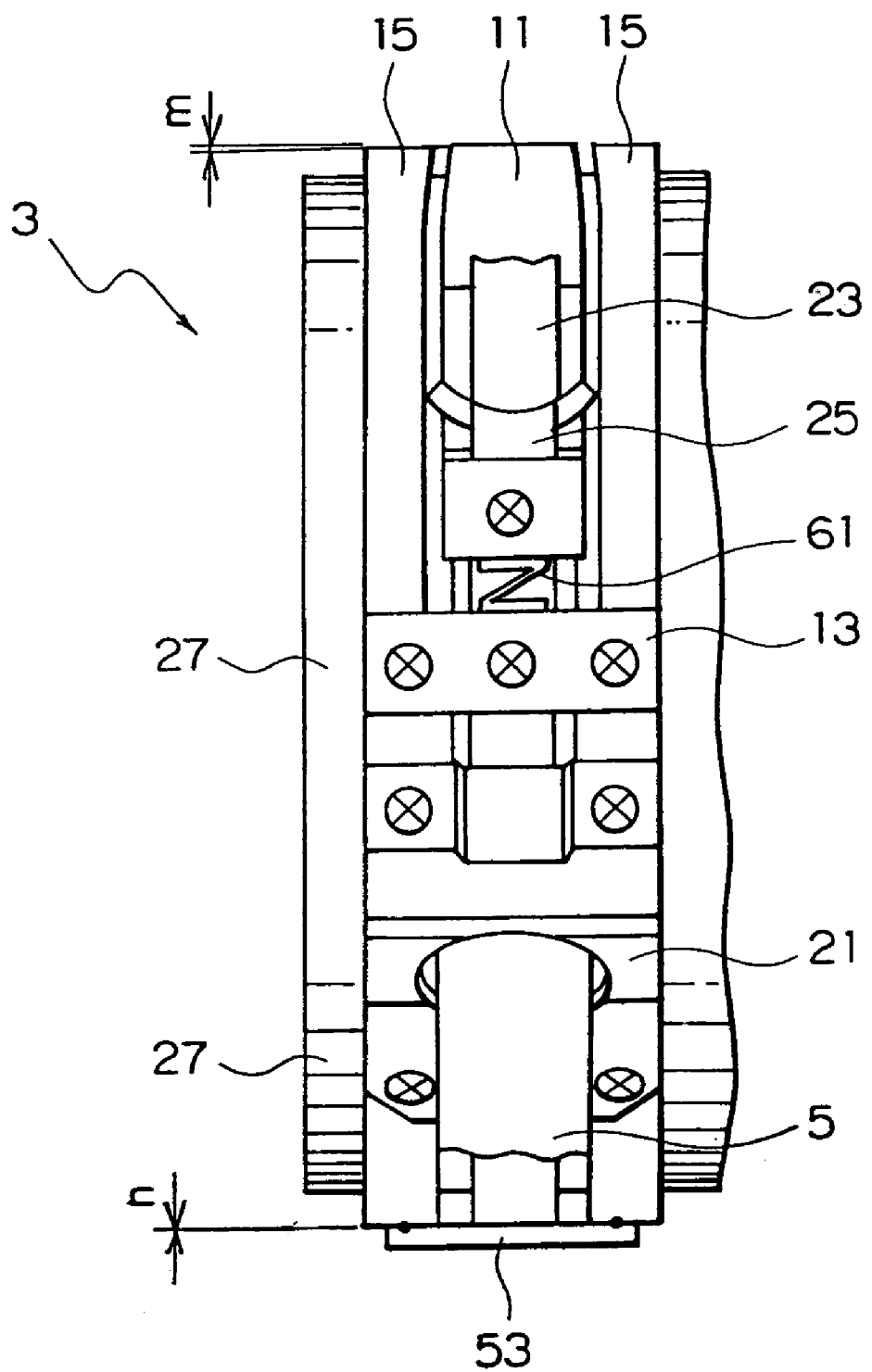
FIG. 7 is a cross-sectional view taken along line C—C in FIG. 6.
Figure 8:
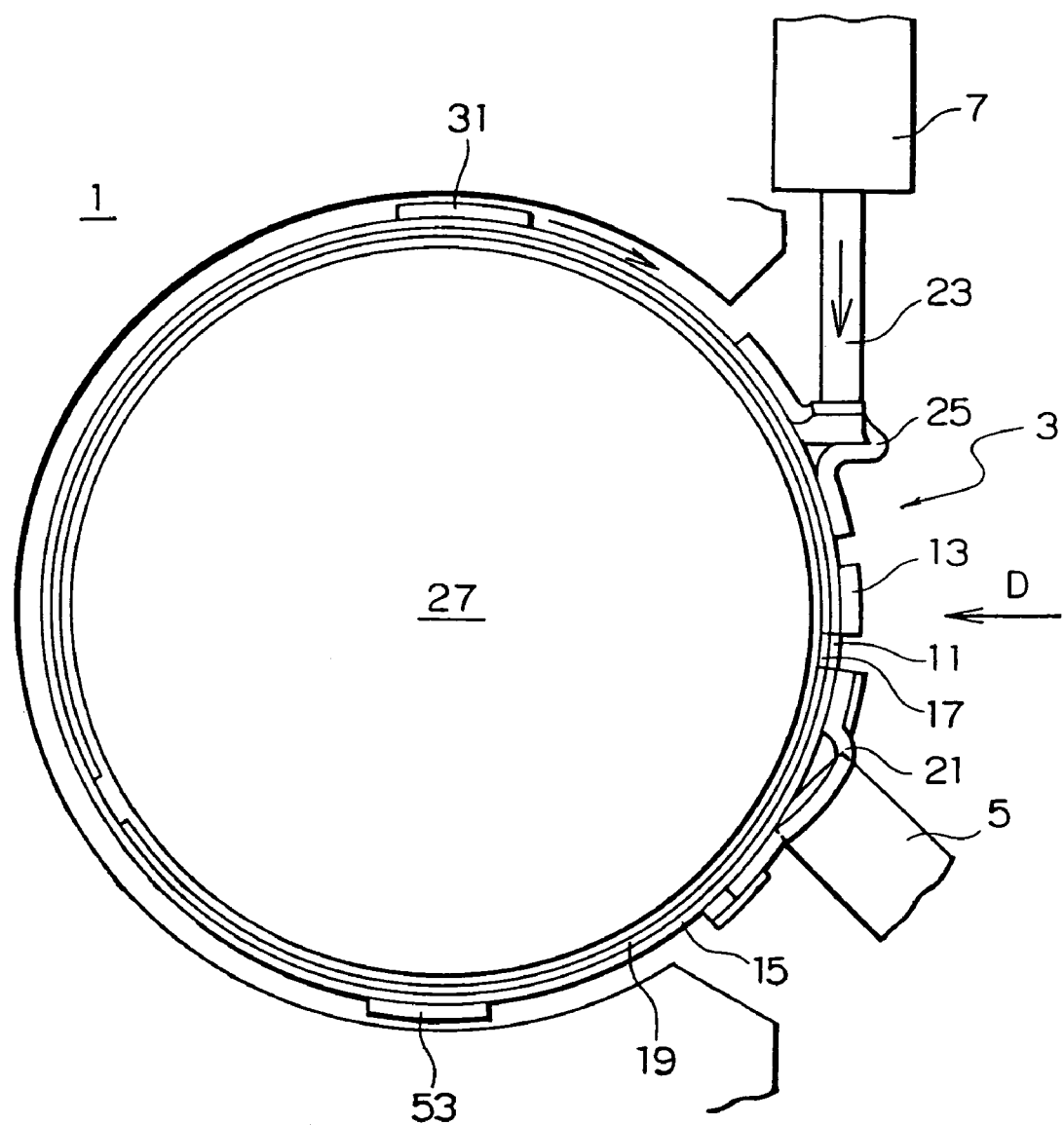
FIG. 8 is a cross-sectional view of an essential part of the correcting ring according to the third embodiment, for showing its set state.

FIG. 6 shows a side view of the correcting ring according to the third embodiment of the present invention, FIG. 7 shows a cross-section taken along line C—C in FIG. 6, and FIG. 8 shows a set state of the correcting ring by way of a cross-sectional view of the essential part thereof. As shown in FIG. 6 and FIG. 7, a correcting ring 41 is formed of a steel plate by press work, and is comprised of three correcting pieces 45 each having three band support protrusions 43 formed on the inner peripheral surface and an engagement protrusion 44 formed on the inner periphery of the end portion, an annular member 47 for coupling these correcting pieces 45, and bearing pieces 49 formed as protruded from the annular member 47 at the same positions as the correcting pieces 45 on the inner peripheral surface.

In the correcting ring 41 of the third embodiment is, in its set state, as shown in FIG. 8, the band support protrusions 43 of the three correcting pieces 45 are brought into sliding contact with the outer peripheral surfaces of the intermediate band 11 and of the outer bands 15, respectively. Also, the bearing pieces 49 come in sliding contact with the outer peripheral surface of the drum 27 which serves as the rotating member, while the engagement pieces 44 are brought into contact with the outer side surface of the outer band 15. With this arrangement, in the third embodiment, a center deviation between the intermediate band 11 and the outer bands 15 is prevented, and a center deviation between the both bands 11 and 15 and the drum 27 also is hardly brought about. As a result, like in the first embodiment, the double-wrap brake band 3 is constricted in a nearly perfect circular form to put a brake on the drum 27 in the braking mode, while having an appropriate space from the drum 27 over the entire circumference thereof in the non-braking mode. Note that the correcting ring 41 does not fall off even if an unintentional force acts thereon, since the engagement protrusions 44 and the bearing pieces 49 are positioned on the outer side surfaces of the both outer bands 15.

Figure 9:
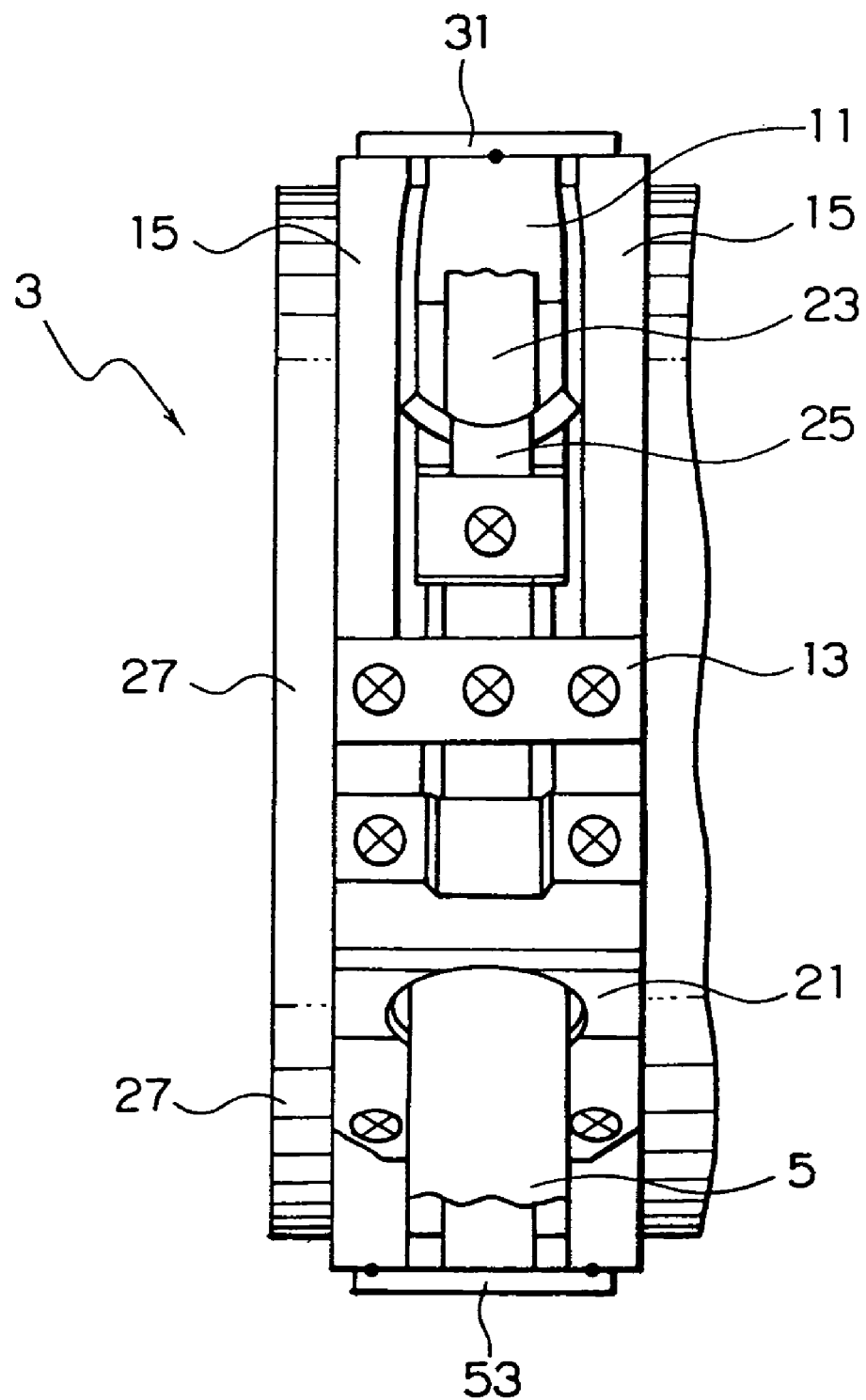
FIG. 9 is a side view for showing a correcting ring according to a fourth embodiment of the present invention.

FIG. 9 shows a side view of the correcting ring according to the fourth embodiment of the present invention. The fourth embodiment has substantially the same basic structure as the third embodiment described above, except that the material and the shape of the correcting ring 41 are different. Specifically, in the fourth embodiment, a resilient material such as a spring steel is used as a material for the correcting ring 41 and, at the same time, a C-shaped member 53 having a cut-away part 51 is used instead of the annular member. With this arrangement, in the fourth embodiment, each of the correcting pieces 45 is brought into pressure contact with the intermediate band 11 and the outer bands 15, so that the correcting rings 41 hardly fall off. However, other operations and effects of the fourth embodiment are the same as those of the third embodiment.

Figure 10:
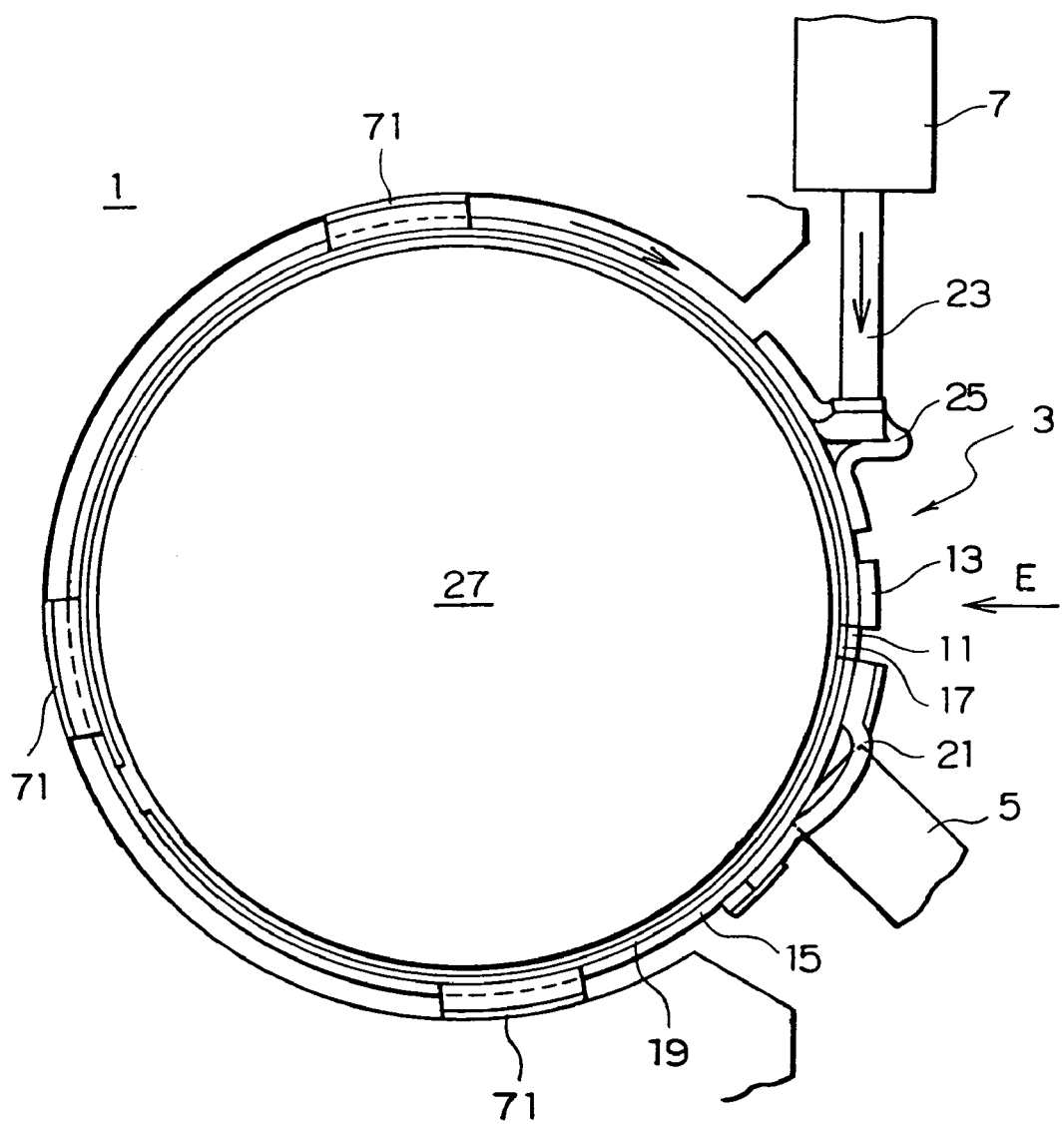
FIG. 10 is a side view for showing a C-shaped resilient ring according to a fifth embodiment of the present invention.
Figure 11:
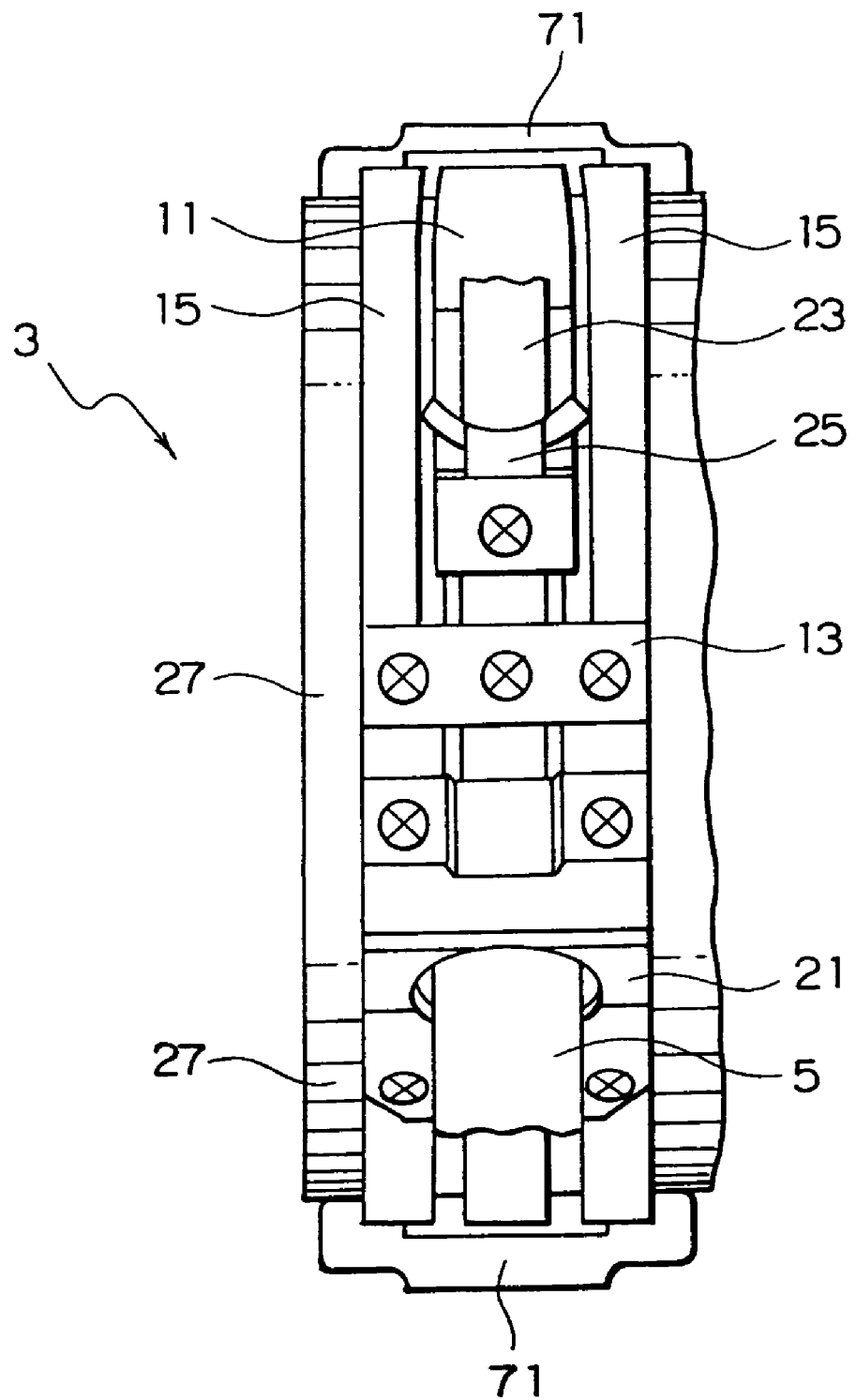
FIG. 11 is a view of a part indicated by the arrow D in FIG. 10.
Figure 12:
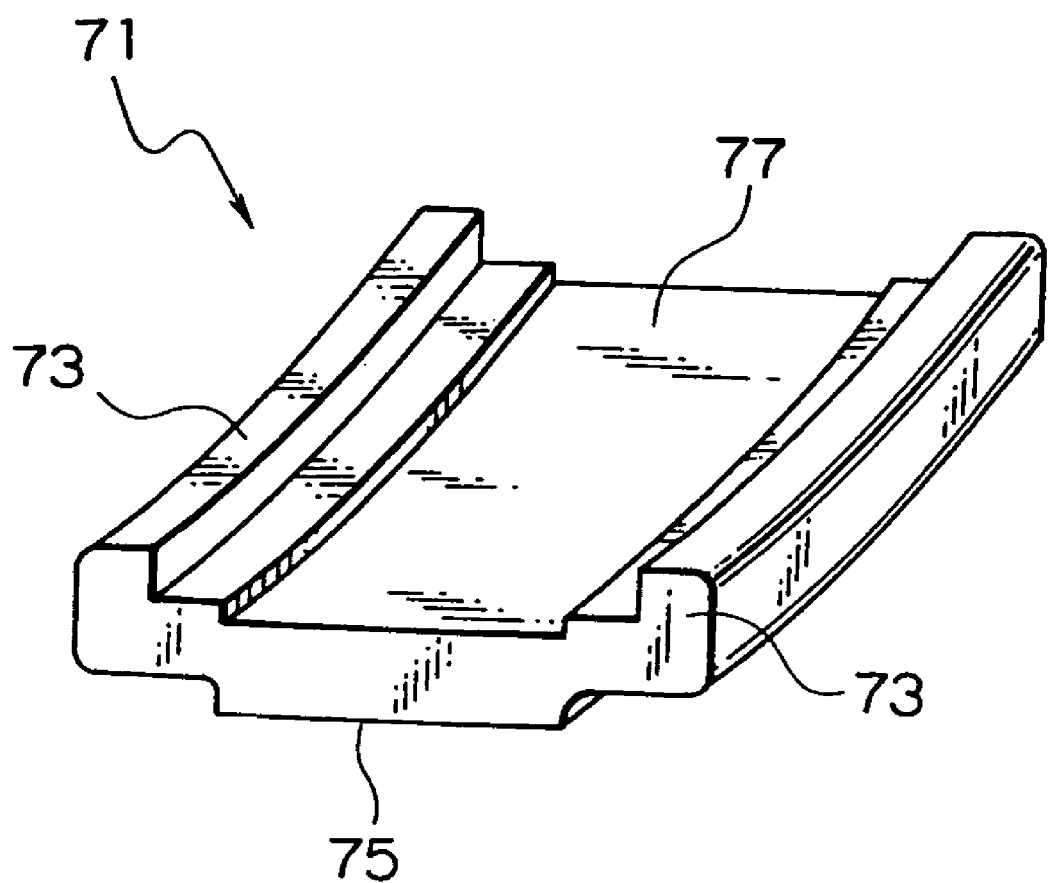
FIG. 12 is a side view of an essential part of the C-shaped resilient ring according to the fifth embodiment, for showing its set state.

FIG. 10 shows a side view of the C-shaped resilient ring according to the fifth embodiment of the present invention, FIG. 11 shows the part indicated by the arrow D in FIG. 10, and FIG. 12 shows a set state of the C-shaped resilient ring by way of a side view. The C-shaped resilient ring 61 of the fifth embodiment is formed of a comparatively thin spring steel plate by press work, to have a C-shaped section with four correcting projections 63 formed on the inner peripheral surface. In case of the fifth embodiment, as shown in FIG. 12, when the C-shaped resilient ring 61 is set, the correcting projections 63 are brought into pressure contact with the intermediate band 11 and the outer bands 15, so as to exhibit the same functions and effects as those of the fourth embodiment.

Figure 13:
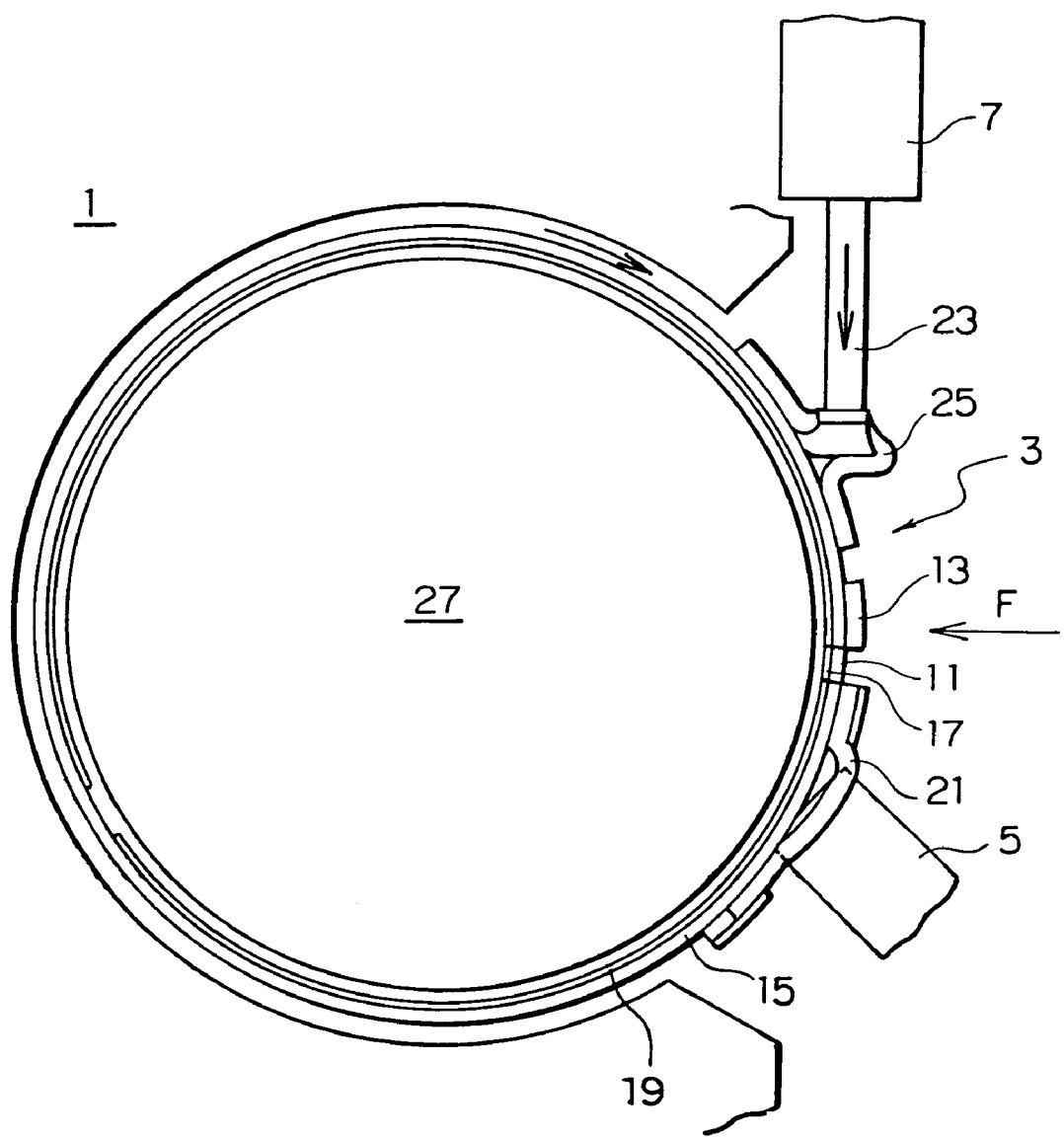
FIG. 13 is a side view for showing a double-wrap band brake apparatus according to a sixth embodiment of the present invention.
Figure 14:
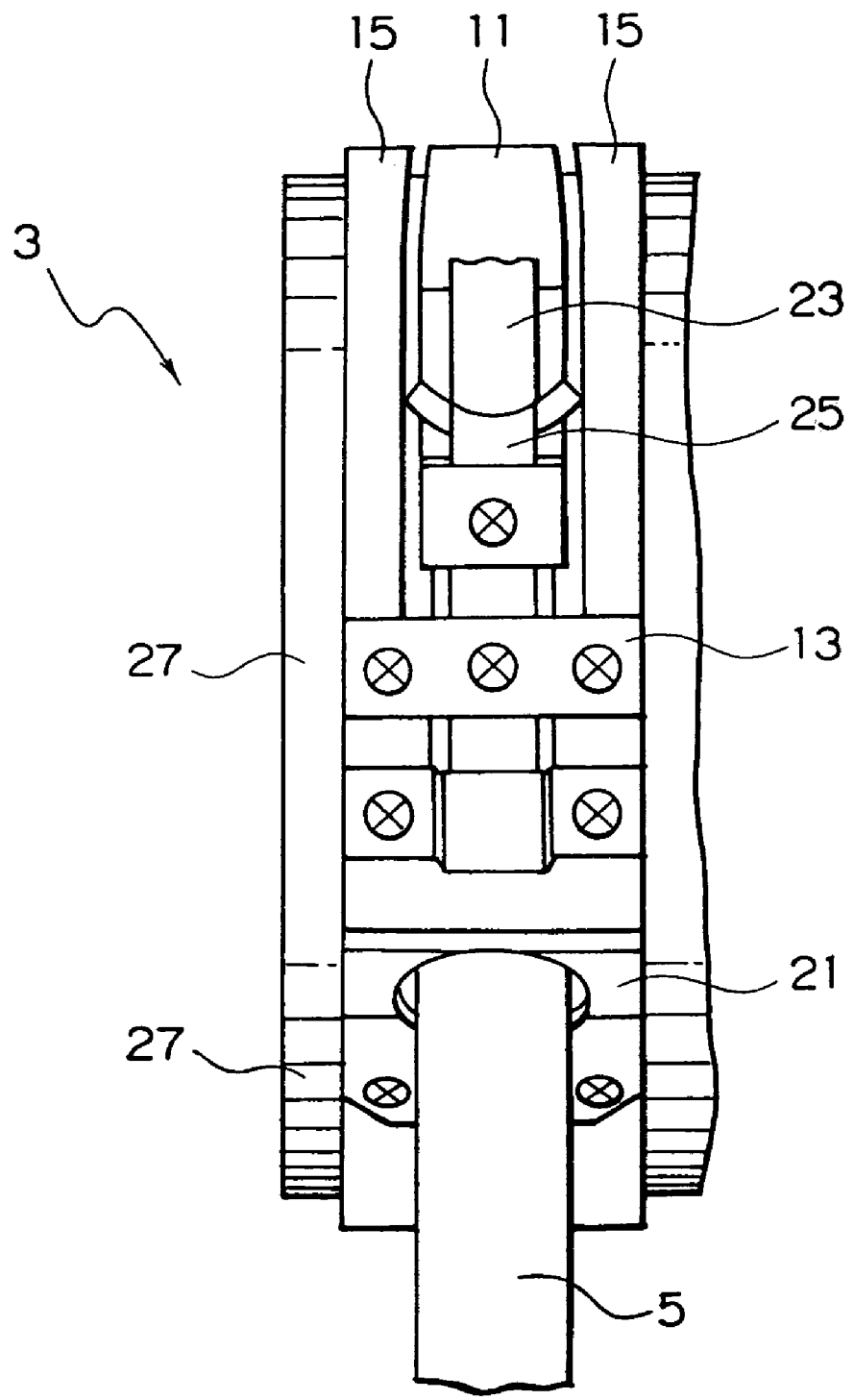
FIG. 14 is a cross-sectional view taken along line E—E in FIG. 13.
Figure 15:
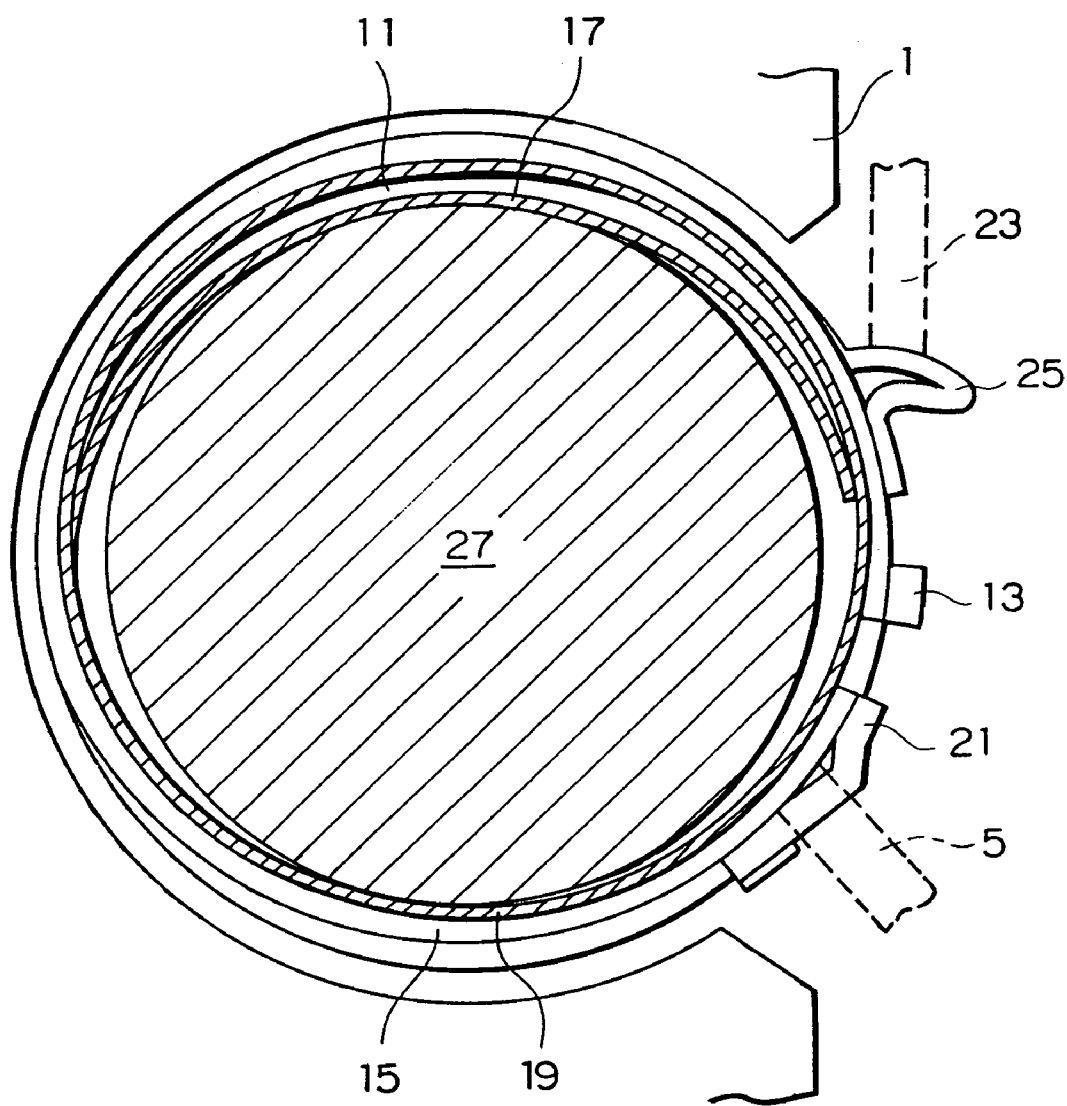
FIG. 15 is a view of a part indicated by the arrow F in FIG. 13.
Figure 16:
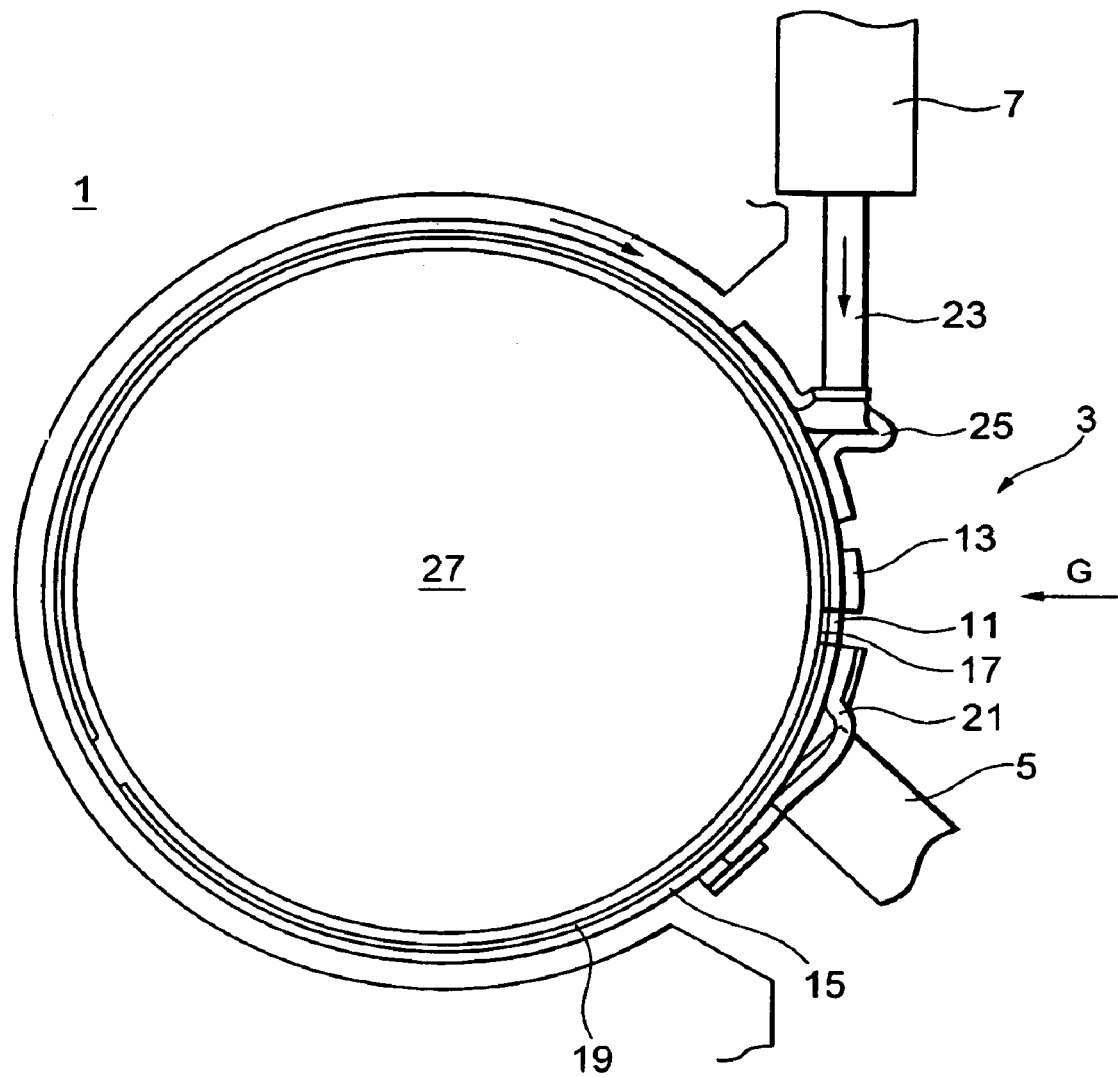
FIG. 16 is a side view for showing a conventional double-wrap band brake apparatus.
Figure 17:
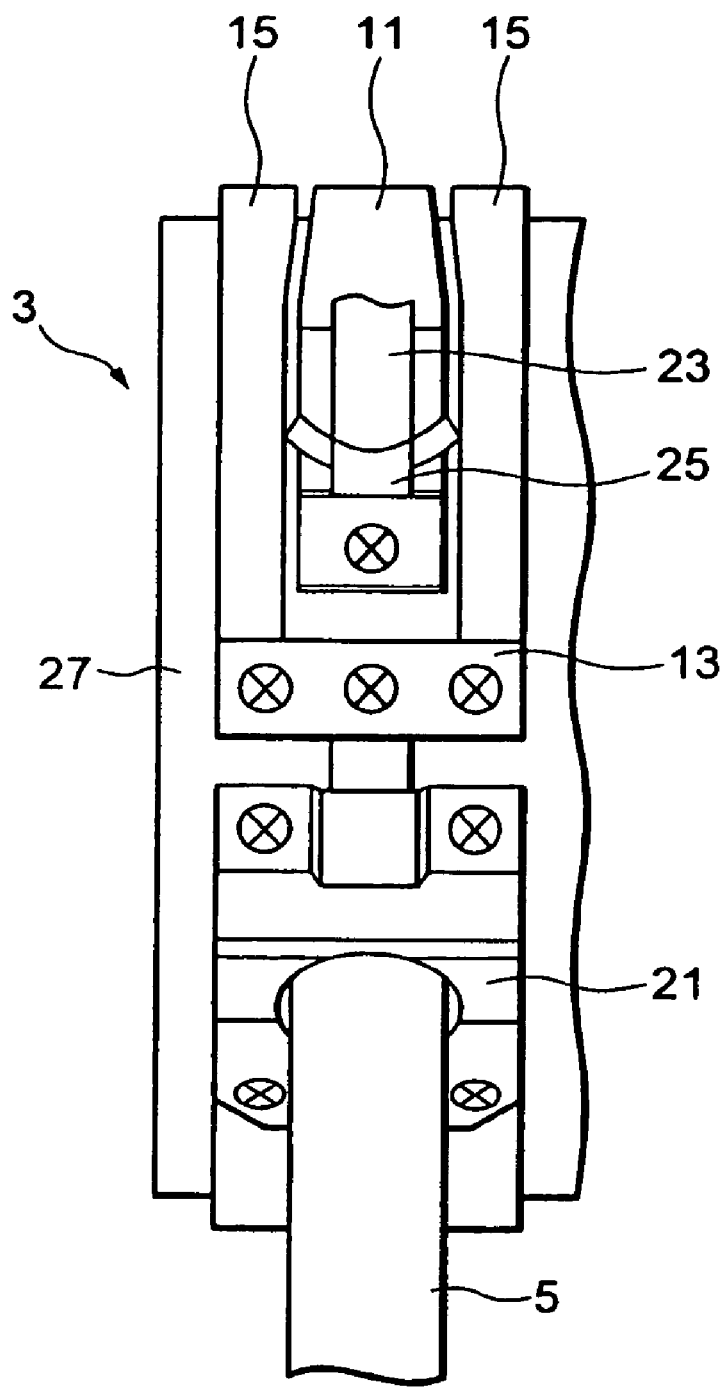
FIG. 17 is a view of a part indicated by the arrow G in FIG. 16.
Figure 18:
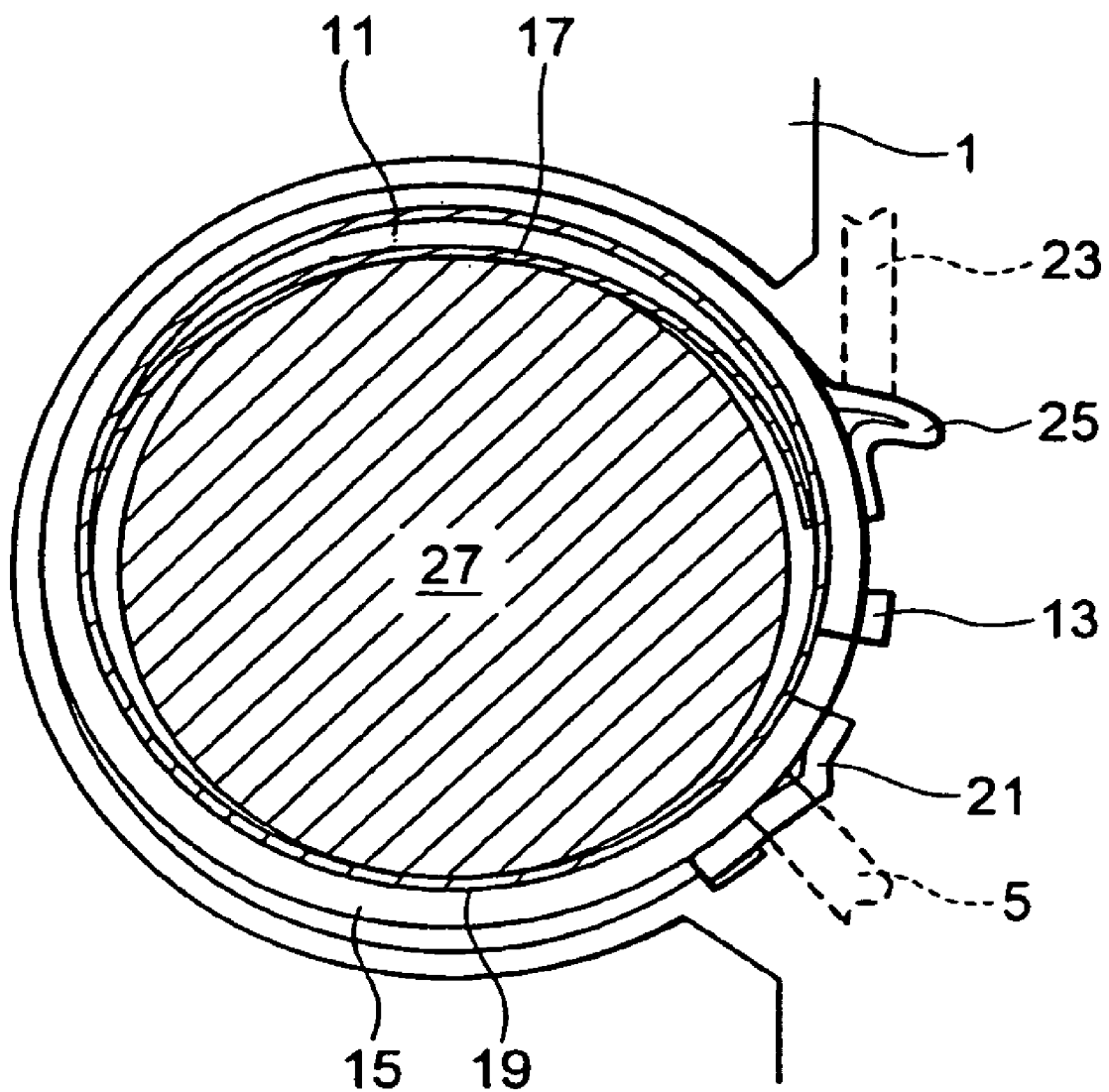
FIG. 18 is a side view for illustrating an operation of the conventional double-wrap band brake apparatus.
Figure 19:
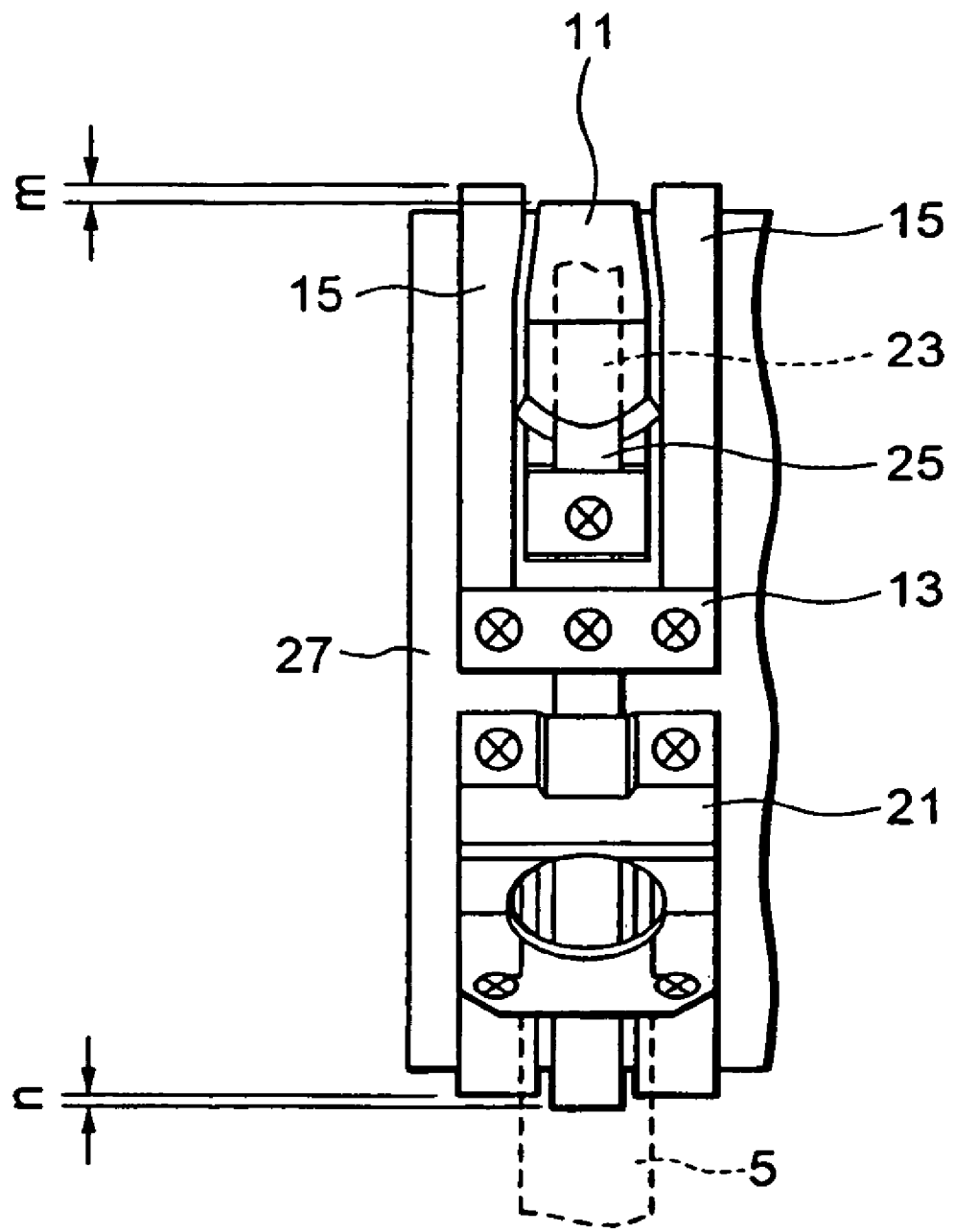
FIG. 19 is a front view for illustrating an operation of the conventional double-wrap band brake apparatus.

FIG. 13 shows the double-wrap band brake apparatus according to the sixth embodiment of the present invention by way of a side view, FIG. 14 shows a cross section taken along line E—E in FIG. 13, and FIG. 15 shows the part indicated by the arrow F in FIG. 13. As shown in these drawings, in the sixth embodiment, a mutual center deviation between the intermediate band 11 and the outer bands 15 is prevented by center deviation correcting clips 71 provided at three positions on the circumference. Each of the center deviation correcting clips 71 is formed of a steel plate by press work and has three band support protrusions 73 formed on the inner peripheral surface thereof. The both ends of the center deviation correcting clip 71 are formed as engagement portions 77 which are to be engaged with engagement protrusions 75 formed on the outer side surfaces of the outer bands 15. By employing such a configuration, the center deviation correcting clip 71 of the sixth embodiment hardly falls off while securely preventing a center deviation between the both bands 11 and 15 in the same manner as in any of the foregoing embodiments, in spite of its comparatively small size.

Though specific description of the embodiments of the present invention is as made above, the present invention is not limited to these embodiments. For example, in the foregoing embodiments, the present invention is applied to a double-wrap band brake apparatus which is installed in the automatic transmission for a vehicle. However, the present invention may be applied to a double-wrap band brake apparatus which is used in an industrial machine or the like. Also, the specific constitutions of the double-wrap band brake apparatus including the specific configurations, the shapes, and the numbers of the center deviation correcting means, the center deviation correcting ring, and the center deviation correcting clip may be appropriately modified within the scope and spirit of the present invention.

According to the double-wrap band brake apparatus of the present invention, since there is the means for correcting a center deviation between the intermediate band and the outer bands, the double-wrap brake band is, while having an appropriate space from the rotating member over the entire circumference thereof when it is in the no-braking mode, constricted in its nearly perfect circular state to put a brake on the rotating member, whereby a loss of the dynamic force or deterioration of the frictional materials due to an unnecessary sliding contact between the frictional materials and the rotating member is not generated.

What is claimed is:

1. A double-wrap band brake apparatus which has a double-wrap brake band comprising:

an annular intermediate band with a frictional surface formed on an inner periphery thereof;

a pair of annular outer bands secured to a free end of said intermediate band in a state that respective free ends of said outer bands oppose to each other and have frictional surfaces respectively formed on inner peripheries thereof;

an anchor bracket having an anchor portion adapted to engage an anchor pin and secured to operating ends of said outer bands to be latched on the side of a main body casing; and an apply bracket secured to an operating end of said intermediate band and having an apply portion disposed to receive a force from an actuator in a direction in which the intermediate band and the outer bands are constricted from an actuator, wherein a center deviation correcting member for correcting a center deviation between said intermediate band and said outer bands is formed on at least one of said anchor bracket and said apply bracket, said center deviation correcting member being positioned at a predetermined distance circumferentially from said anchor portion or said apply portion of said at least one of said anchor bracket and said apply bracket, and having portions positioned to substantially prevent said outer bands from becoming radially outwardly deviated relative to said intermediate band.

2. A double-wrap band brake apparatus according to claim 1, wherein said center deviation correcting member is formed on integrally with said apply bracket and is positioned at a predetermined circumferential distance from said apply portion of said apply bracket, and wherein said center deviation correcting member comes in sliding contact with outer peripheral surfaces of said outer bands.

3. A double-wrap band brake apparatus according to claim 1, wherein said center deviation correcting member is a correcting member which is formed on said anchor bracket and comes in sliding contact with outer peripheral surfaces of said outer bands.

4. A double-wrap band brake apparatus according to claim 2, wherein said center deviation correcting member is a correcting member which is formed on said anchor bracket and comes in sliding contact with outer peripheral surfaces of said outer bands.

5. A double-wrap band brake apparatus according to claim 1, wherein said center deviation correcting member is a circumferentially extended element formed integrally with said at least one of said anchor bracket and said apply bracket, said circumferentially extended element being in sliding contact with an outer peripheral surface of at least one of said outer bands and said intermediate band.

6. A double-wrap band brake apparatus according to claim 5, wherein said center deviation connecting member is formed integrally with said apply bracket, and wherein said circumferentially extended element is in sliding contact with outer peripheral surfaces of said outer bands.

7. A double-wrap band brake apparatus according to claim 1, wherein said center deviation correcting member includes a plate member which is substantially flat in an axial cross-section of the apparatus.

8. A double-wrap band brake apparatus according to claim 1, wherein said center deviation correcting member makes contact with said outer bands and said intermediate band at points substantially equidistant from an axis of the apparatus.

\* \* \* \* \*